(12) United States Patent
Wadewitz

(10) Patent No.: US 6,249,786 B1
(45) Date of Patent: Jun. 19, 2001

(54) DATA-CONVERSION METHOD

(76) Inventor: Rolf Wadewitz, Ruhr-Monne-Eck 9, D-59755 Arnsberg (DE)

(*) Notice: Subject to any disclaimer, the term of this patent is extended or adjusted under 35 U.S.C. 154(b) by 0 days.

(21) Appl. No.: 09/155,338

(22) PCT Filed: Mar. 21, 1997

(86) PCT No.: PCT/EP97/01442
§ 371 Date: Sep. 23, 1998
§ 102(e) Date: Sep. 23, 1998

(87) PCT Pub. No.: WO97/36250
PCT Pub. Date: Oct. 2, 1997

(51) Int. Cl.[7] .................................................. G06F 17/30
(52) U.S. Cl. .................. 707/6; 707/4; 707/203; 707/500
(58) Field of Search ................... 707/1, 6, 200, 707/203, 500, 504, 511; 704/2

(56) References Cited

U.S. PATENT DOCUMENTS

| | | | |
|---|---|---|---|
| 5,579,521 | * 11/1996 | Shearer et al. | 709/300 |
| 5,845,283 | * 12/1998 | Williams et al. | 707/101 |
| 5,948,057 | * 9/1999 | Berger et al. | 709/205 |
| 5,995,980 | * 11/1999 | Olson et al. | 707/201 |
| 6,081,811 | * 6/2000 | Nilsson | 707/201 |

FOREIGN PATENT DOCUMENTS 0 130 375 A2 * 9/1985 (EP) .................................. 15/40

* cited by examiner

Primary Examiner—Thomas Black
Assistant Examiner—Mary Wang
(74) Attorney, Agent, or Firm—Scullly, Scott Murphy & Presser

(57) ABSTRACT

A method for conversion of data between two applications or software packages, respectively, using different data formats to each other is provided. As a central problem in todays data processing, the bringing together and the exchange of data sources of different software packages has been recognized. For an intelligent conversion software there are viewed in the first place data structures from databases and data processing systems. Proceeding from the first recognition of a coarse structure, the file form is pre-classified in conversion tools. The conversion software provides a set of algorithms, by which the fine structure is detected and transformed automatically. The analysis of sample files from applications A and B is continued in the sub-structures, whereas finally, with the help of the analysis, the source data is converted into the target data being imported from application B.

11 Claims, 4 Drawing Sheets

DATA-CONVERSION METHOD

TECHNICAL FIELD OF THE INVENTION

The invention relates to a method for data conversion between two applications or software packages, respectively, which use different data formats according to the main part of claim 1.

BACKGROUND OF THE INVENTION

The invention is based on the fundamental problem of incompatibility of data of different applications or software packages, respectively. Many programs comprise their own data format for internal processing of data. But this is rarely readable by other programs for processing. The user's problem is to transport any data from application A to application B, generally the data formats of applications A and B being unknown to him. The data to transport are in most cases databases, but there could be also application data in the widest sense, e.g. textual data, CAD data, sound formats, spreadsheet programs, and so on.

To realize the above mentioned data transfer, modern and flexible programs offer the possibility to read data in the very common formats and to process them further in their own format. To make an exchange between different applications possible, for example also from different operating systems, some software packages provide import and export functions in ASCII format or in another usual format.

Beyond this there exist many utility programs, which allow data conversions from one format A to another format B. Those programs have implemented a fixed predefined conversion algorithm, which corresponds to the respective application. Then, the user may choose, between which data formats A and B the program should realize a conversion. Those utility programs could partially recognize the kind of the file, or the kind of the application A, respectively, automatically through simple characteristics in the fileform, as for example the fileform and fixed information structures and version marks in the file itself.

A special method for data conversion is already known from DE 41 28 940 A1. With the help of this method, print-prepared digital data from a document generated at a terminal of a data processing system containing text and/or graphic software are converted into facsimile specific transfer data. This method replaces the complicated, time consuming and erroned method to print a document generated at a terminal of a data processing system with a connected printer and afterwards to scan the paper-printed document through an optoelectronic device of a facsimile system. Then, the scan data of the optoelectronic device is facsimile specific coded and transfered.

The conversion programs integrated in the applications as well as independent utility programs for data conversion both have the disadvantage that only a limited selection of data formats is available, which can be converted by the fixed algorithms of the program. These conversions usually do not consider the element contents and the logic therebetween, as for example character contents and character length, language aspects, existence rules, element transformations, language room, element patterns and element interpretations. Besides, most of the data formats are not standarized very well, and many applications comprise their own data structures. The data elements are optimized for the source application and could cause errors while being processed in the target application, which have to be corrected large-scale manually by the user or even make a further processing of the data impossible.

SUMMARY OF THE INVENTION

It is an object of this invention to provide a method for data conversion for the user which makes a flexible data adaption from any different application-program possible by relatively simple means.

This object is achieved by means of the features of claim 1.

Further inventive features and arrangements of the invention are described in the subclaims.

The conversion software according to the invention is able to transfer data of any format A to data of any format B half and also fully automatically, whereby in principle no restriction relating to the possible data-formats arise. Because of the data formats A and B being half as well as fully automatically analysed by the conversion software according to the invention beyond the coarse structure of the data also in their fine structure, the possible error rate during the data transfer from application A to application B is significant less than with the usual utility programs. Additionally, there are provided data changes and data adaptations in diverse levels, for example in the file, record, element levels and so on, to reduce the error rate in the target application.

BRIEF DESCRIPTION OF THE DRAWINGS

The structure of the method for data conversion according to the invention is shown in the drawing and explained in the following, in which.

DETAILED DESCRIPTION

Figure 1:
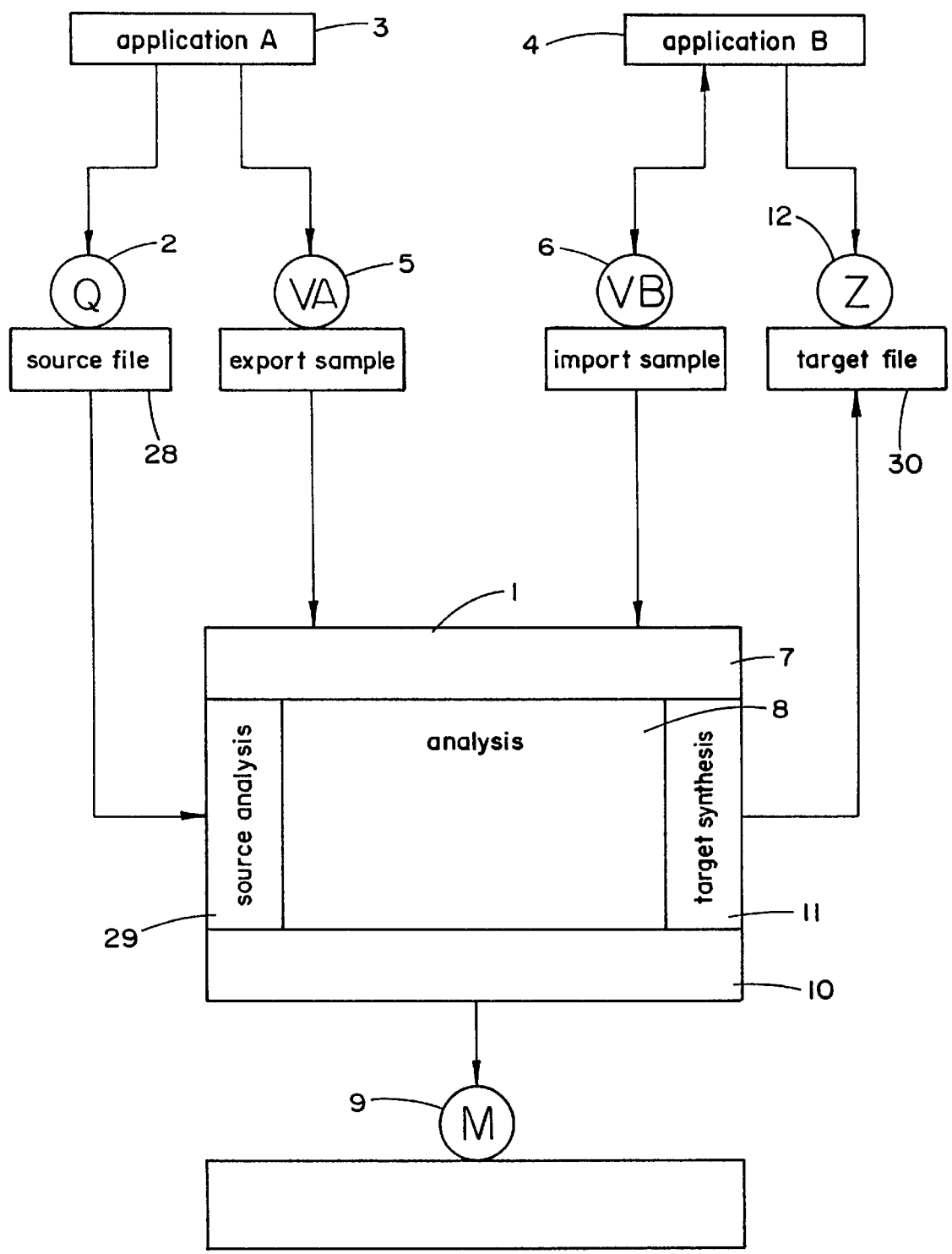
FIG. 1 shows the information process chart of the method for data transfer.

FIG. 1 shows in form of an information process chart the cycle of a data transfer by means of the method according to the invention or the conversion software (1) according to the invention, respectively. A user wants to transport any source data Q (2) which is created in and exported from application A (3) to application B (4) for further processing. Each of the applications A (3) and B (4) are able to import and export their own data in a format understandable to themselves; this is implemented in the applications (3) and (4) to exchange data between applications of equal kind on different working places.

Now, the user can create a sample export of for example about 500 data records out of the data stock of application A (3) and of application B (4). By this, the sample file VA (5) from application A (3) and the sample file VB (6) from application B (4) arise. A precondition for the functioning of the method for data conversion is that the application B (4) can re-import its own created and exported sample file VB(6) which of course should work. Now, the sample files VA (5) and VB (6) can be analysed (7) by the conversion software (1).

In principle, the data transfer from application A (3) to application B (4) is also possible directly, without the way across the file (for example OLE, DDE and so on). Here, the detour across the files is saved, while the analysis and connection-processes stay in effect, of course.

Since the user in general does not know anything about the construction of the data structures and about the data structures of the applications A (3) and B (4), and he also does not want to know anything about that, there is the need for complex algorithms for analysis, to relieve the user from decisions and to automate or at least partly automate the analysis and connection process (8). The implemented algorithms can be extended without any difficulties to analyse also new data structures appearing in the future. The scope of analysis (8) of the structures is described further below along with FIG. 2. After the analysis and connection process (8), the conversion software (1) knows the data structure of the sample files VA (5) and VB (6) and also the necessary connections between the elements of the sample files VA (5) and VB (6). This conversion pattern for the transfer of data from application A (3) to application B (4) is saved as pattern-cycle data M.

If the user wants to transfer data between the same applications A (3) and B (4) as described above at a later time, it is possible to save (10) the just determined conversion pattern in form of the pattern-cycle data M (9). Thus, it is unnecessary for the user in the next conversion process to create the sample files VA (5) and VB (6) and the conversion software (1) can directly access the saved pattern-cycle data M (9) and re-read the pattern-cycle data M (9) to transfer the data without the need of an analysis process (8).

Figure 4:
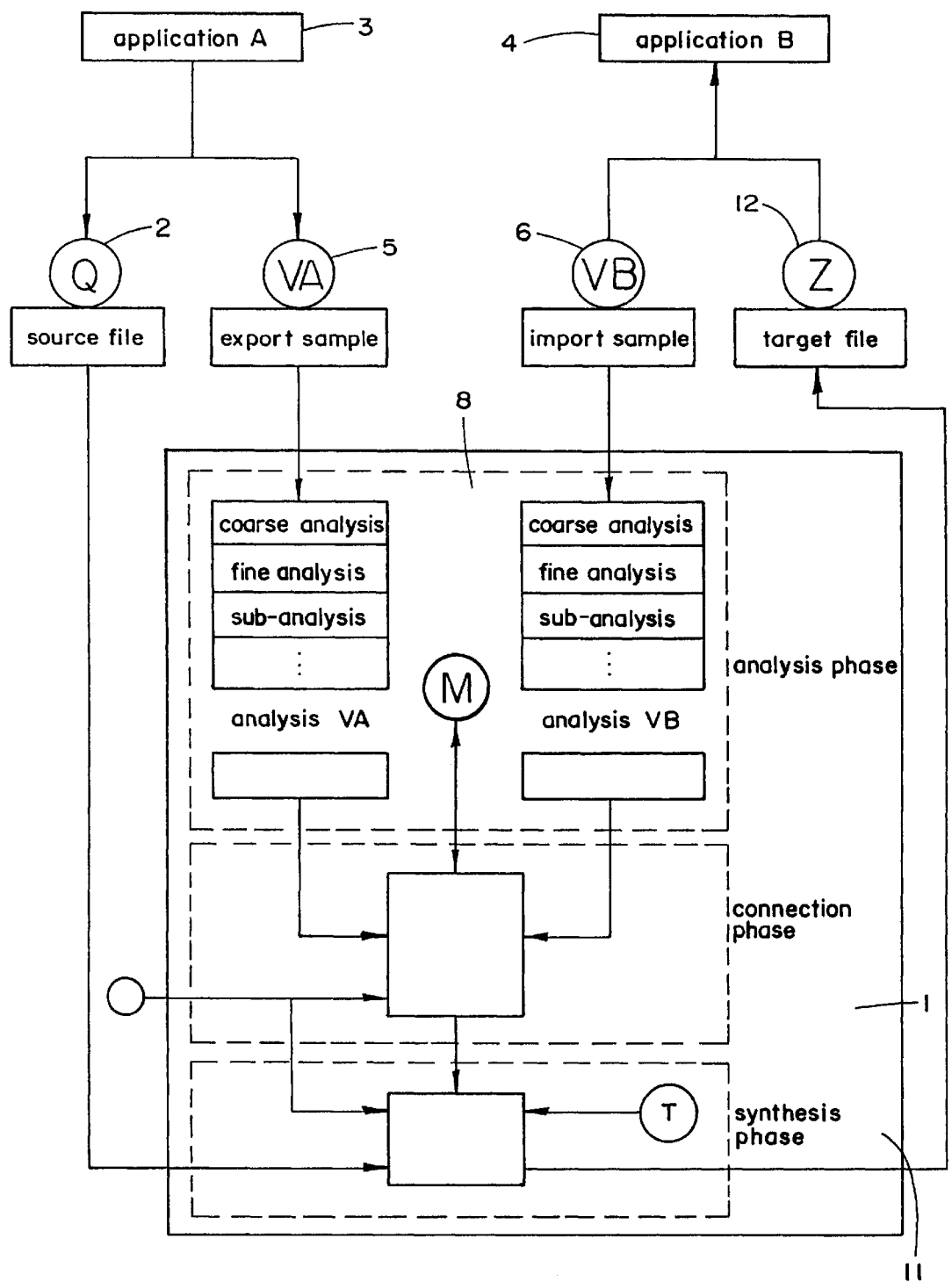
FIG. 4 shows the information process chart of FIG. 1 in detail.

As shown especially in FIG. 4 in addition to FIG. 1, the phase of analysis of the sample file VA(5) as well as of the sample file VB (6) is subdivided in a coarse analysis, a following fine analysis and a further following sub-analysis and so forth, to come finally to the final analysis. Adjoining to the analysis phase is the connection phase, in which the analysis of the sample files are linked together.

In the synthesis phase (11) a conversion of the source data (2) into the target data Z (12) is achieved by means of the determined analysis and connection results. In the last step, the application B (4) can import and process further the target data Z (12), because the target data Z (12) is available in a data-format im- and exportable by application B (4).

By this method for data-conversion according to the invention, it is further possible for the user to carry out data changes by the use of user-defined special rules in the synthesis (11) of the source data Q (2) into the target data Z (12). As examples, and not at all completely enumerated, it is here only named the substitution of letters ä, ö, ü through ae, oe, ue and the reorganization of the elements [Dear] and [Mister xyz] into the elements [Dear mister] and [xyz]. Of course, there are possible also very complex data changes, which can be compared best with the concept of "morphing" from the image-processing, which describes the change from one pattern A to another pattern B without any information-losses.

As it is shown in FIG. 1, the source file (28) of application A (3) to be exported is given into the source analysis (29). After the analysis for automatic rule creation and connections in block (8) had taken place, the target analysis (11) is going to be created. Then, the converted data is given then into the importable target-file (30). In the process of exporting the source file (28) into the target file (30) by means of the pattern-cycle data M, a source or target analysis is no longer necessary. Also, the rule creation and connections are already generated with the sample files VA (5) and VB (6). At the synthesis, the source file Q (2) is read and processed with the data filter from pattern-cycle data M. The generated data records are written to the target file. The data filter may use external files for adaption as well as internal files for seeking and sorting.

Figure 2:
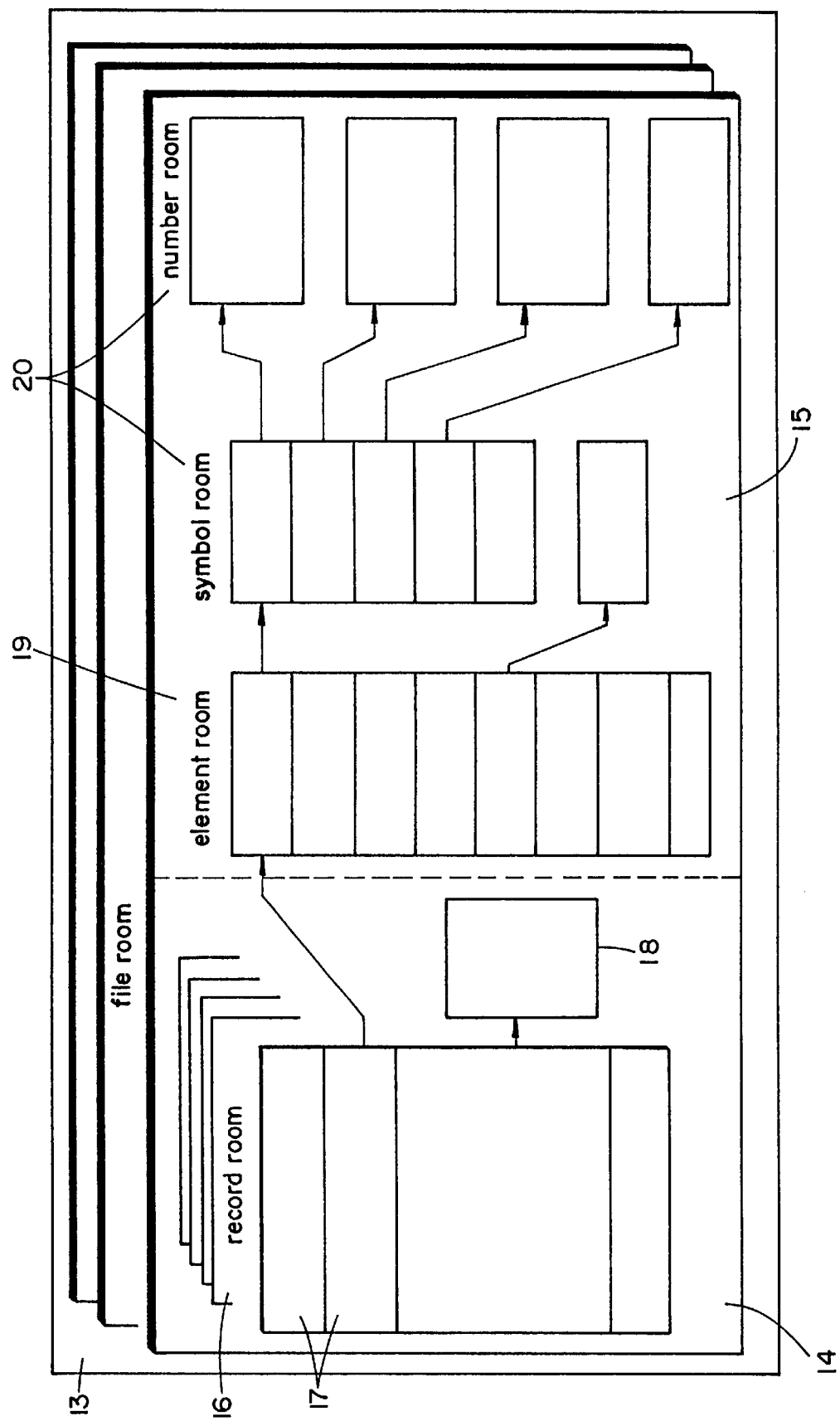
FIG. 2 shows a diagram of the structure analysis of the method with detailled structure-pattern.

FIG. 2 shows a diagram representing the structure of a general data transfer file in detail. The analysis (8) of the sample files VA (5) and VB (6) is subdivided in a plurality of phases. Proceeding from the first identification of the coarse structure (13) the file form gets pre-classified, as with the known conversion programs. The intelligent conversion software makes now an additional set of algorithms available, which is able to determine the fine structure (14) of the present data automatically. The analysis (8) continues to recognize also the sub-structures (15) within the data elements (17).

As it can also be seen from FIG. 2, the coarse structure (13) serves to recognize the file structure, the separation characters, the element names, the character length, and so on, in the file room and in the record room. In the coarse structure (13), files are distinguished by their file form. The differences can be identified for example by file extensions or by information structures inside the whole file.

The fine structure (14) serves to recognize element existence, element character contents, element character length, and so on, in the element room (19) and symbol room (20). The fine structure (14) is related to the record level, which contains the construction of a single data record in the so-called record room (16) from the elements (17), as well as the connections of the record elements (17) among one another, the so-called record rule room (18). By the finding of characteristics for the data record construction and the data record structure, for example the field names in a data record (16) are analysed, the use of special separation symbols for elements (17) and data records (16), the use of start and stop symbols for structuring inside the elements (17) and the number of elements (17) per record (16) are determined.

The sub-structure (15) serves to recognize words and sub-elements with sub-dividers in the single elements, like element room (19), symbol room, word room. Thus, the sub-structure is subdivided once more in the element level, the element room (19), and the symbol level, the symbol room with number room (20). In the element level (19) the characteristics of existence for an element (17) are defined.

As characteristics of existence appear for example: minimum and maximum data element character length, data element existence precondition (must, can, may), permissible and occuring characters in a data element (17), used language room, limited list structures inside of data elements (17), word analysis, and so on. The symbol level (20) predefines the possible selection spaces for numbers, letters, special characters, OEM-characters and others.

The element "working-time", for example, may contain a
1st record "Meier/Müller/Graf/Kemper", a
2nd record "8 h/7 h/9 h/8 h" and a
3rd record "5 h/9 h/11 h/7 h".
Thus, in the element "working-time" there are apparently sub-structures, which are divided by the character "/". Such and similar sub-structures are recognized and treated in the analysis as additional elements with names, that is Meier, Müller, Graf, Kemper, and the corresponding contents.

As explained above, the element "Address" contains several words:
1st record "Dear Mr.",
2nd record "Dear Mrs.",
3rd record "Hello, Mr.",
4th record "Dear Mr. Dipl.-Ing.".
These sub-structures are taken over as words in word lists and, if necessary, further separately analysed for additional patterns and rules.

To make this more clear, see another example. The element "street" contains the patterns:

1st record "Hofweg 13",

2nd record "Am langen Kant 77" and

3rd record "Bremer Strasse 19".

These sub-structures (15) are analysed as words and examined for patterns. Thus, e.g. the street name and the house number can be splitted.

It is of great importance that the sub-structures (15) are related to objects in a level below the record elements. Here, the element contents are examined for further patterns.

The pattern structure is processed with the pattern and connections analysis (record room (16), record rules room, element room (19), word room), using the above mentioned analysis-results. Thereby, spreaded patterns and rules are determined by means of fixed algorithms and neuronal as well as fuzzy-algorithms.

To make the process of pattern recognition in the grammatical analysis (8) of the fine structure (14) and the sub-structure (15) running as far as possible automatically, the use of modern algorithm technics, such as neuronal nets and fuzzy-logic beside fixed algorithms is required. If such approaches are leaved out, the user may have to process single connections manually, if necessary.

Figure 3:
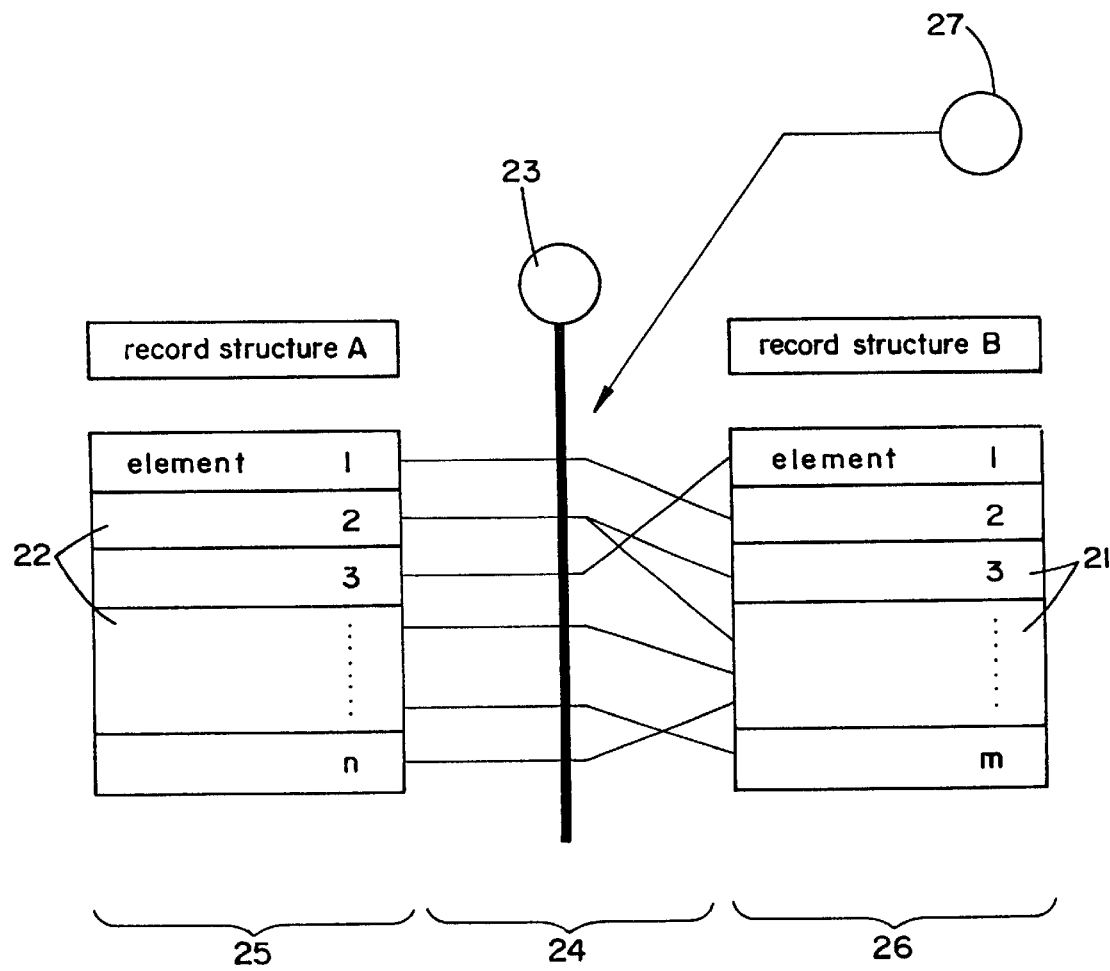
FIG. 3 shows the synthesis cycle of the method for generating the data B out of the data A.

FIG. 3 shows in diagram form the synthesis cycle (11) for the construction of the data elements (21) for application B (4) out of the data elements (22) of application A (3). From the above described analysis (8) of the sample files VA (5) and VB (6) a data filter (23) results, which contains the previously determined connection rules (24) between the data elements (21) and (22). If the data records (25) of application A (3) are sent through this data filter (23), new data records (26) with new data elements (21) are obtained, which are available in a data format being importable and exportable by application B (4). The number of data elements (22) of the data records (25) from application A (3) is not necessarily the same as the number of the data elements (21) of the data records (26) for application B (4); the number of data records (25) and (26) is in general the same for applications A (3) and B (4).

In addition to the data filter (23) for the data transfer from application A (3) to application B (4), which has been created by the the analysis (8) of the sample files VA (5) and VB (6), there is also a possibility of an adaption of the data elements (21) and (22) with an external database or several external databases (27), for example also the mixture of several databases like customer-file+account-file. With such an external adaption, there could be checked for example the ZIP-codes of the data records (25) and (26) by comparing the data elements (21) and (22) of country, city, street and ZIP-code with those from the external database.

Additionally, it is possible to set up one or more internal temporary databases for seeking and sorting at file level. This is necessary to allow a fast seeking and sorting, for example according to the alphabet or according to special characteristics.

REFERENCE NUMERALS 1 conversion software or conversion method
2 source data Q
3 application A
4 application B
5 sample file VA
6 sample file VB
7 input analysis pattern
8 analysis, process of analysis
9 pattern-cycle data M
10 saving of the pattern-cycle data
11 synthesis, synthesis phase
12 target data Z
13 coarse structure
14 fine structure
15 sub-structure
16 data record
17 (data) element
18 record rule room
19 element level
20 symbol level
21 data elements
22 data elements
23 data filter
24 connections, connection rules
25 data records
26 data records
27 external database
28 source file
29 source analysis
30 target file

What is claimed is:

1. A method for conversion of source data into target data between two applications using data formats different from each other, said method comprising:

exporting a relatively small quantity of data records out of data stock of a first application and out of data stock of a second application into a first export file from the first application and a second export file from the second application, wherein the second application is able to re-import the data records of the second export file;

analyzing structure of the first export file and the second export file via conversion software to create a conversion pattern result including automatically establishing: (a) a coarse structure for the first export file and the second export file structure for classifying file forms of the first export file and the second export file based on their coarse structure; (b) a fine structure by recognizing record data elements and connections between the record data elements based on construction of a record of each of the first export file and second export file using a set of algorithms; and (c) a sub-structure within the record data elements of each of the first export file and the second export file using the set of algorithms; and converting the source data based on said conversion pattern result obtained in the analyzing step into the target data for being imported by the second application.

2. The method according to claim 1, comprising a further step of:

saving the conversion pattern result obtained in the analyzing step in a form of pattern-cycle data for future direct conversion of the source data from the first application to the target data of second application.

3. The method according to claim 1, wherein the source data after the analyzing step is given into a target synthesis by which it is converted into the target data.

4. The method according to claim 1, the analyzing step further comprising:

classifying the first export file and the second export file by their form.

5. The method according to claim 4, wherein the fine structure is related to a record level containing the construction of the record and the connections between the record data elements among one another.

6. The method according to claim 5, wherein the substructure is subdivided into an elements level in which existence characteristics are defined for one record data element, and a symbol level comprising symbol room and number room.

7. The method according to claim 6, wherein the set of algorithms employs technologies of neuronal nets and/or fuzzy-logic.

8. The method according to claim 7, comprising a further step of:

constructing a data filter based on the conversion pattern result obtained by analyzing structure of the first export file and the second export file, said data filter comprising connection rules between the record data elements of the first export file and the second export file at file level, whereby after passing of data records from the first application through the data filter, new data records with new data elements (21) are obtained in a data format importable and exportable by the second application.

9. The method according to claim 8, wherein the record data elements of the first export file and the second export file are adaptable with one or more external databases.

10. The method according to claim 9, comprising a further step of:

establishing one or more internal temporary databases for seeking and sorting of the data records.

11. A method for analyzing rules for conversion of source data into target data between two applications using data formats different from each other, said method comprising:

exporting a relatively small quantity of data records out of data stock of a first application and out of data stock of a second application into a first export file from the first application and a second export file from the second application, wherein the second application is able to re-import the data records of the second export file; and analyzing structure of the first export file and the second export file via conversion software to create a conversion pattern result including automatically establishing: (a) a coarse structure for the first export file and the second export file structure for classifying file forms of the first export file and the second export file based on their respective coarse structure; (b) a fine structure by recognizing record data elements and connections between the record data elements based on construction of a record of each of the first export file and second export file using a set of algorithms; and (c) a substructure within the record data elements of each of the first export file and the second export file using the set of algorithms.

* * * * *